United States Patent
Hanna et al.

(10) Patent No.: US 8,960,382 B2
(45) Date of Patent: Feb. 24, 2015

(54) CHAMBER WITH FILLER MATERIAL TO DAMPEN VIBRATING COMPONENTS

(75) Inventors: Michael D. Hanna, West Bloomfield, MI (US); Mark A. Golden, Washington, MI (US); John C. Ulicny, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 719 days.

(21) Appl. No.: 12/105,483

(22) Filed: Apr. 18, 2008

(65) Prior Publication Data

US 2009/0260932 A1    Oct. 22, 2009

(51) Int. Cl.
*F16D 65/12*    (2006.01)
*F16F 7/01*    (2006.01)
*F16F 15/14*    (2006.01)
*F16F 15/16*    (2006.01)
*F16F 15/36*    (2006.01)

(52) U.S. Cl.
CPC ............... *F16F 7/01* (2013.01); *F16F 15/145* (2013.01); *F16F 15/16* (2013.01); *F16F 15/366* (2013.01); *F16F 2222/04* (2013.01)
USPC ................................................. 188/218 XL

(58) Field of Classification Search
CPC ....................... F16D 65/12; F16D 2250/00
USPC ................... 188/218 XL, 268, 373, 378
See application file for complete search history.

(56) References Cited

U.S. PATENT DOCUMENTS

| | | | |
|---|---|---|---|
| 1,989,211 A | 1/1935 | Norton | |
| 2,603,316 A | 7/1952 | Pierce | |
| 2,844,229 A * | 7/1958 | Whitfield | 188/218 XL |
| 3,085,391 A | 4/1963 | Hatfield et al. | |
| 3,147,828 A | 9/1964 | Hunsaker | |
| 3,292,746 A | 12/1966 | Robinette | |
| 3,378,115 A | 4/1968 | Stephens, III | |
| 3,425,523 A | 2/1969 | Robinette | |
| 3,435,935 A * | 4/1969 | Warman | 192/107 R |
| 3,478,849 A * | 11/1969 | Hahm | 188/218 XL |
| 3,509,973 A | 5/1970 | Kimata | |
| 3,575,270 A * | 4/1971 | Wagenfuhrer et al. | 192/107 R |
| 3,774,472 A | 11/1973 | Mitchell | |
| 3,841,448 A | 10/1974 | Norton, Jr. | |
| 3,907,079 A * | 9/1975 | Chapman | 188/290 |
| 3,975,894 A | 8/1976 | Suzuki | |

(Continued)

FOREIGN PATENT DOCUMENTS

CN    2005/10113784.X    10/2005
DE    24 46 938    4/1976

(Continued)

OTHER PUBLICATIONS

PCT International Search Report, International Application No. PCT/US2009/039841 filed Apr. 8, 2009, Applicant: GM Global Technology Operations, Inc., 3 pages.

(Continued)

*Primary Examiner* — Vishal Sahni
(74) *Attorney, Agent, or Firm* — BrooksGroup

(57) ABSTRACT

A component defines at least one chamber that is confined by the component. The chamber has an inner surface. A filler material is disposed inside the chamber. Relative movement between the inner surface and the filler material helps dampen vibrations and other oscillations if and when the component is vibrated.

27 Claims, 1 Drawing Sheet

(56) References Cited

U.S. PATENT DOCUMENTS

| | | | |
|---|---|---|---|
| 4,049,085 A | 9/1977 | Blunier | |
| 4,072,219 A | 2/1978 | Hahm et al. | |
| 4,250,950 A | 2/1981 | Buxmann et al. | |
| 4,379,501 A | 4/1983 | Hagiwara et al. | |
| 4,475,634 A | 10/1984 | Flaim et al. | |
| 4,523,666 A | 6/1985 | Murray | |
| 4,905,299 A | 2/1990 | Ferraiuolo et al. | |
| 5,004,078 A * | 4/1991 | Oono et al. | 188/218 A |
| 5,025,547 A | 6/1991 | Sheu et al. | |
| 5,058,453 A | 10/1991 | Graham et al. | |
| 5,083,643 A | 1/1992 | Hummel et al. | |
| 5,115,891 A | 5/1992 | Raitzer et al. | |
| 5,139,117 A | 8/1992 | Melinat | |
| 5,143,184 A | 9/1992 | Snyder et al. | |
| 5,183,632 A | 2/1993 | Kiuchi et al. | |
| 5,259,486 A | 11/1993 | Deane | |
| 5,310,025 A | 5/1994 | Anderson | |
| 5,416,962 A | 5/1995 | Passarella | |
| 5,417,313 A | 5/1995 | Matsuzaki et al. | |
| 5,509,510 A | 4/1996 | Ihm | |
| 5,530,213 A | 6/1996 | Hartsock et al. | |
| 5,582,231 A | 12/1996 | Siak et al. | |
| 5,620,042 A | 4/1997 | Ihm | |
| 5,660,251 A | 8/1997 | Nishizawa et al. | |
| 5,709,288 A * | 1/1998 | Riebe | 188/218 XL |
| 5,789,066 A | 8/1998 | DeMare et al. | |
| 5,819,882 A | 10/1998 | Reynolds et al. | |
| 5,855,257 A | 1/1999 | Wickert et al. | |
| 5,862,892 A | 1/1999 | Conley | |
| 5,862,897 A | 1/1999 | Allport et al. | |
| 5,878,843 A | 3/1999 | Saum | |
| 5,921,357 A * | 7/1999 | Starkovich et al. | 188/267.2 |
| 5,927,447 A | 7/1999 | Dickerson | |
| 6,047,794 A | 4/2000 | Nishizawa | |
| 6,073,735 A | 6/2000 | Botsch et al. | |
| 6,206,150 B1 | 3/2001 | Hill | |
| 6,216,827 B1 | 4/2001 | Ichiba et al. | |
| 6,223,866 B1 | 5/2001 | Giacomazza | |
| 6,241,055 B1 | 6/2001 | Daudi | |
| 6,241,056 B1 | 6/2001 | Cullen et al. | |
| 6,283,258 B1 | 9/2001 | Chen et al. | |
| 6,302,246 B1 | 10/2001 | Naumann et al. | |
| 6,357,557 B1 | 3/2002 | DiPonio | |
| 6,405,839 B1 | 6/2002 | Ballinger et al. | |
| 6,465,110 B1 | 10/2002 | Boss et al. | |
| 6,481,545 B1 | 11/2002 | Yano et al. | |
| 6,505,716 B1 | 1/2003 | Daudi et al. | |
| 6,507,716 B2 | 1/2003 | Nomura et al. | |
| 6,543,518 B1 | 4/2003 | Bend et al. | |
| 6,799,664 B1 | 10/2004 | Connolly | |
| 6,880,681 B2 | 4/2005 | Koizumi et al. | |
| 6,890,218 B2 | 5/2005 | Patwardhan et al. | |
| 6,899,158 B2 | 5/2005 | Matuura et al. | |
| 6,932,917 B2 | 8/2005 | Golden et al. | |
| 7,066,235 B2 | 6/2006 | Huang | |
| 2001/0045332 A1* | 11/2001 | Takahashi et al. | 188/218 XL |
| 2002/0084156 A1 | 7/2002 | Ballinger et al. | |
| 2002/0104721 A1 | 8/2002 | Schaus et al. | |
| 2003/0037999 A1 | 2/2003 | Tanaka et al. | |
| 2003/0127297 A1 | 7/2003 | Smith et al. | |
| 2003/0141154 A1 | 7/2003 | Rancourt et al. | |
| 2003/0213658 A1 | 11/2003 | Baba | |
| 2004/0031581 A1 | 2/2004 | Herreid et al. | |
| 2004/0045692 A1 | 3/2004 | Redemske | |
| 2004/0074712 A1 | 4/2004 | Quaglia et al. | |
| 2004/0084260 A1 | 5/2004 | Hoyte et al. | |
| 2004/0242363 A1 | 12/2004 | Kohno et al. | |
| 2005/0011628 A1 | 1/2005 | Frait et al. | |
| 2005/0150222 A1 | 7/2005 | Kalish et al. | |
| 2005/0183909 A1 | 8/2005 | Rau, III et al. | |
| 2005/0193976 A1 | 9/2005 | Suzuki et al. | |
| 2006/0076200 A1* | 4/2006 | Dessouki et al. | 188/218 XL |
| 2006/0243547 A1 | 11/2006 | Keller | |
| 2007/0142149 A1 | 6/2007 | Kleber | |
| 2011/0114421 A1* | 5/2011 | Piech et al. | 187/276 |

FOREIGN PATENT DOCUMENTS

| | | | |
|---|---|---|---|
| DE | 25 37 038 | | 3/1977 |
| DE | 199 48 009 | | 3/2001 |
| DE | 101 41 698 | | 3/2003 |
| DE | 10141698 | * | 3/2003 |
| DE | 102005048258.9 | | 10/2005 |
| EP | 0 205 713 | | 12/1986 |
| GB | 998453 | * | 7/1965 |
| GB | 1230 274 | | 4/1971 |
| GB | 2328952 | | 3/1999 |
| JP | 57154533 | | 9/1982 |
| JP | 58091936 | * | 6/1983 |
| JP | 2003269538 | | 9/2003 |
| WO | WO 98/23877 | | 6/1998 |
| WO | WO 01/36836 | | 5/2001 |
| WO | 2006024515 A1 | | 3/2006 |

OTHER PUBLICATIONS

PCT International Written Opinion, International Application No. PCT/US2009/039841 filed Apr. 8, 2009, Applicant: GM Global Technology Operations, Inc., 4 pages.

International Search Report dated Apr. 2, 2007 for International Application No. PCT US06/29687, Publication No. WO 2007/040768; GM Global Technology Operations, Inc.

Omar Dessouki, George Drake, Brent Lowe, Wen Kuei Chang, General Motors Corp: Disc Brake Squeal: Diagnosis & Prevention. 03NVC-224; Society of Automotive Engineer, Inc. 2002.

Z. Wu, C. Richter, L. Menon, A Study of Anodization Process During Pore Formation in Nanoporous Alumina Templates, Journal of the Electrochemical Society, vol. 154, 2007.

W.-J. Lee, M. Alhoshan, W.H. Smyrl, Titanium Dioxide Nanotube Arrays Fabricated by Anodizing Processes, Journal of the Electrochemical Society, vol. 153, 2006, pp. B499-B505.

I.V. Sieber, P. Schmuki, Porous Tantalum Oxide Prepared by Electrochemical Anodic Oxidation, Journal of the Electrochemical Society, vol. 152, 2005, pp. C639-C644.

H. Tanaka, A. Shimada, A. Kinoshita, In situ Measurement of the Diameter of Nanopores in Silicon During Anodization in Hydrofluoric Acid Solution, Journal of the Electrochemic.

L.G. Hector, Jr., S. Sheu, Focused Energy Beam Work Roll Surface Texturing Science and Technology, Journal of Materials Processing & Manufacturing Science, vol. 2, Jul. 1993.

P.N. Anyalebechi, Ungrooved Mold Surface Topography Effects on Cast Subsurface Microstructure, Materials Processing Fundamentals, TMS 2007, pp. 49-62.

F. Yigit, Critical Wavelengths for Gap Nucleation in Solidification—Part 1: Theoretical Methodology, Journal of Applied Mechanics, vol. 67, Mar. 2000, pp. 66-76.

P.N. Anyalebechi, Undulatory Solid Shell Growth of Aluminum Alloy 3003 as a Function of the Wavelength of a Grooved Mold Surface Topography, TMS 2007, pp. 31-47.

Dessouki et al., U.S. Appl. No. 10/961,813, Coulumb friction damped disc brake rotors, filed Oct. 8, 2004.

Hanna et al., U.S. Appl. No. 11/475,756, Bi-metal disc brake rotor and method of manufacturing, filed Jun. 27, 2006.

Schroth et al., U.S. Appl. No. 11/475,759, Method of casting components with inserts for noise reduction, filed Jun. 27, 2006.

Schroth et al., U.S. Appl. No. 12/025,967, Damped products and methods of making and using the same, filed Feb. 5, 2008.

Hanna et al., U.S. Appl. No. 11/440,916, Bi-metal disc brake rotor and method of manufacture, filed May 25, 2006.

Hanna et al., U.S. Appl. No. 11/554,234, Coulomb damped disc brake rotor and method of manufacturing, filed Oct. 30, 2006.

Walker et al., U.S. Appl. No. 11/926,798, Inserts with holes for damped products and methods of making and using the same, filed Oct. 29, 2007.

Hanna et al., U.S. Appl. No. 11/832,401, Damped product with insert and method of making the same, filed Aug. 1, 2007.

Kleber, et al., U.S. Appl. No. 11/848,732, Cast-in-place torsion joint, filed Aug. 31, 2007.

Hanna et al., U.S. Appl. No. 11/780,679, Method of manufacturing a damped part, filed Jul. 20, 2007.

(56) References Cited

OTHER PUBLICATIONS

Aase et al., U.S. Appl. No. 11/969,259, Method of forming casting with frictional damping insert, filed Jan. 4, 2008.

Hanna et al., U.S. Appl. No. 12/165,729, Method for securing an insert in the manufacture of a damped part, filed Jul. 1, 2008.

Hanna et al., U.S. Appl. No. 12/165,731, Product with metallic foam and method of manufacturing the same, filed Jul. 1, 2008.

Agarwal et al., U.S. Appl. No. 11/860,049, Insert with tabs and damped products and methods of making the same, filed Sep. 24, 2007.

Hanna et al., U.S. Appl. No. 12/174,163, Damped part, filed Jul. 16, 2008.

Hanna et al., U.S. Appl. No. 12/174,223, Method of casting damped part with insert, filed Jul. 16, 2008.

Hanna et al., U.S. Appl. No. 12/183,180, Casting noise-damped, vented brake rotors with embedded inserts, filed Jul. 31, 2008.

Hanna et al., U.S. Appl. No. 12/183,104, Low mass multi-piece sound damped article, filed Jul. 31, 2008.

Golden et al., U.S. Appl. No. 12/105,411, Insert with filler to dampen vibrating components, filed Apr. 18, 2008.

Hanna et al., U.S. Appl. No. 11/440,893, Rotor assembly and method, filed May 25, 2006.

Carter, U.S. Appl. No. 11/680,179, Damped automotive components with cast in place inserts and method of making same, filed Feb. 28, 2007.

Ulicny et al., U.S. Appl. No. 12/105,438, Filler material to dampen vibrating components, filed Apr. 18, 2008.

Hanna et al., U.S. Appl. No. 12/272,164, Surface configurations for damping inserts, filed Nov. 17, 2008.

Hanna et al., U.S. Appl. No. 12/145,169, Damped product with an insert having a layer including graphite thereon and methods of making and using the same, filed Jun. 24, 2008.

Lowe et al., U.S. Appl. No. 12/174,320, Damped part with insert, filed Jul. 16, 2008.

Xia, U.S. Appl. No. 12/858,596, Lightweight brake rotor and components with composite materials, filed Sep. 20, 2007.

Dessouki et al., U.S. Appl. No. 12/178,872, Friction damped brake drum, filed Jul. 24, 2008.

Sachdev et al., U.S. Appl. No. 11/832,356, Friction welding method and products made using the same, filed Aug. 1, 2007.

\* cited by examiner

Us 8,960,382 B2

CHAMBER WITH FILLER MATERIAL TO DAMPEN VIBRATING COMPONENTS

TECHNICAL FIELD

The field to which the disclosure generally relates includes products and methods used to help dampen vibrations in components.

BACKGROUND

Certain components are subjected to various vibrations or other oscillations when in use. Such vibrations could have undesirable effects such as, among other things, generating noise, having increasing frequency amplitude, or having a prolonged period of vibration modes. In some cases it may be desirable to dampen or otherwise dissipate the vibrations.

SUMMARY OF EXEMPLARY EMBODIMENTS OF THE INVENTION

One exemplary embodiment may include a product which may include a component that defines at least one chamber that is confined by the component. The chamber has an inner surface. A filler material is disposed inside of the chamber. Relative movement, among other things, between the inner surface and the filler material may help dampen vibrations and other oscillations in the component if and when the component is vibrated or otherwise oscillated.

Another exemplary embodiment may include a product which may include a brake rotor. The brake rotor may include a hub portion and a cheek portion that extends from the hub portion. The cheek portion defines a chamber that is confined by the cheek portion and that has an inner surface. A filler material is disposed inside of the chamber. Relative movement, among other things, between the inner surface and the filler material may help dampen vibrations and other oscillations in the brake rotor when the brake rotor is vibrated or otherwise oscillated.

Another exemplary embodiment may include a method of making a product. The method may include providing a component. The method may also include forming at least one cavity in the component, the cavity having an inner surface. The method may also include filling the cavity at least partially with a filler material so that the filler material contacts the inner surface. The method may also include closing the cavity to form a chamber that is confined by the component and that holds the filler material therein.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

The figures illustrate a component, such as an automotive component, that defines a chamber 10 that holds a filler material 12 to help dampen or otherwise dissipate vibrations or other oscillations in the component. The automotive component may be any component in an automobile that may be subjected to vibrations such as a brake rotor 14, an electrical motor, a transmission housing, an exhaust manifold, a cylinder head, brackets, or the like. Other components may include non-automotive applications, including but not limited to, sporting equipment, housing appliances, manufacturing equipment such as lathes, milling/grinding/drilling machines, or other components subjected to vibrations. Some of these components may be manufactured by a variety of processes including casting, machining, injection molding, or any other suitable process. In the embodiment shown, the brake rotor 14 may be subjected to vibrations when a pair of pads is forced against the brake rotor by a caliper in order to generate friction that slows or stops the associated automobile.

Figure 1:
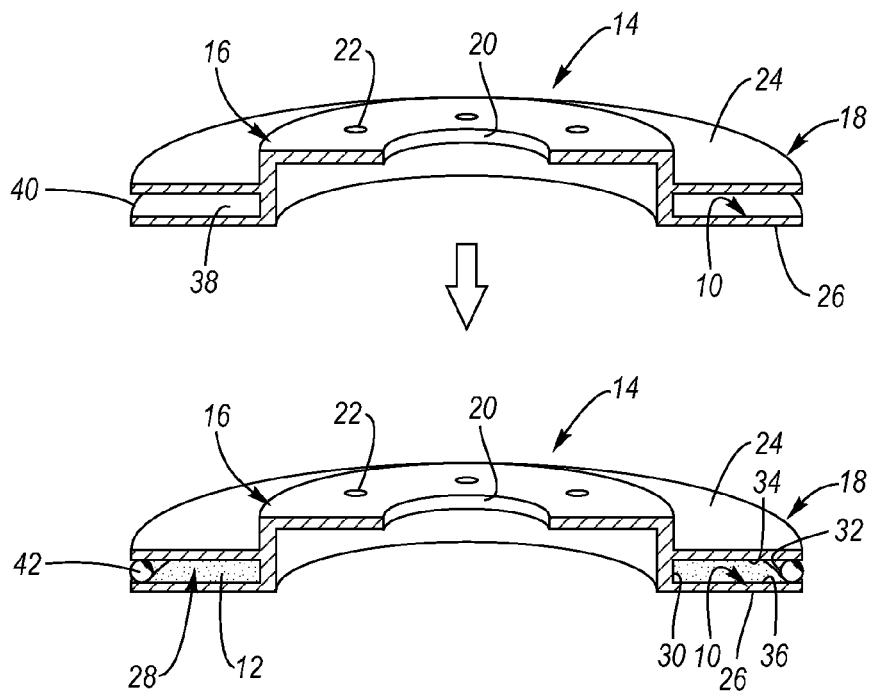
FIG. 1 is a schematic showing one example method of making a brake rotor having a chamber with a filler material, and showing, in cross-section, one embodiment of the brake rotor.
Figure 2:
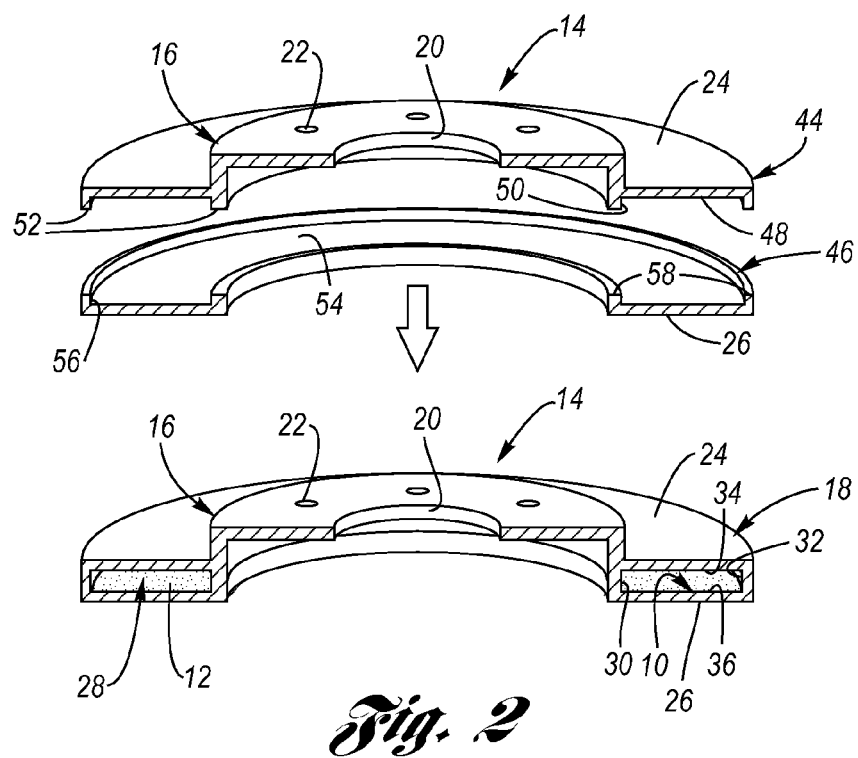
FIG. 2 is a schematic showing one example method of making a brake rotor having a chamber with a filler material, and showing, in cross-section, one embodiment of the brake rotor.

The brake rotor 14 may be of the solid-type as shown, may be of the vented-type (not shown) having a plurality of vanes, or may be another type. Referring to FIGS. 1 and 2, the brake rotor 14 may include a hub portion 16 and a cheek portion 18 extending from the hub portion. The hub portion 16 may define a central aperture 20 and may also define a plurality of bolt holes 22. The cheek portion 18 may include a first cheek face 24 and an opposite second cheek face 26 that each or together constitute braking or friction surfaces of the brake rotor 14. The brake rotor 14 may be manufactured by a casting process to form its one-piece structure. In select exemplary embodiments, the brake rotor 14 may include iron, titanium, aluminum, magnesium, steel, or any of a variety of other alloys or metal matrix composites. As will be appreciated by skilled artisans, the exact casting process used to form the brake rotor 14, including the number of steps, the order of the steps, the parameters in each step, and the like, may vary between particular components. For instance, the casting process may be a vertical or horizontal process, and may be a sand casting process.

The chamber 10 may be formed or defined in the particular component, and filled with the filler material 12 to help dampen vibrations and other oscillations in the component when the component is vibrated or otherwise oscillated. For example, the chamber 10 and the filler material 12 may help dissipate vibrations, oscillations, and other associated effects in the component through energy absorption. When the component is vibrated, relative movement or contact or both at an interface formed between the chamber 10 and the filler material 12 absorbs energy that consequently dampens vibrations. In the case where the filler material 12 is a solid material or in a solid state, energy is absorbed by the relative sliding and other movement between the chamber 10 and the filler material 12 to generate friction that consequently dampens vibrations. The chamber 10 may be an enclosed space that is completely confined by and bounded by the component. The chamber 10 may have various shapes, sizes, and numbers other than those shown in order to accommodate different components and different filler materials. For example, several separate chambers may be defined at separate locations in a component in order to dampen vibrations at those locations. FIGS. 1 and 2 show examples of chambers for use with the brake rotor 14 where the chamber 10 has a generally rectangular cross-sectional profile and extends continuously around a circumference of the brake rotor 14. The chamber 10 may have an inner surface 28 that constitutes the entire surface of the chamber that is exposed to the filler material 12. The inner surface 28 may have an inside surface 30 that constitutes the radially innermost surface of the inner surface, an outside surface 32 that constitutes the radially outermost surface of the inner surface, an upper surface 34 that constitutes the axially uppermost surface of the inner surface, and a lower surface 36 that constitutes the axially lowermost surface of the inner surface.

In some embodiments, the inner surface 28 may be coated to facilitate energy absorption between the chamber 10 and the filler material 12 and to thus help dampen vibrations. Suitable coatings may include a plurality of particles which may be bonded to each other and/or to the inner surface 28 or to the outer surface of the filler material 12 (in the case of a solid filler material) by an inorganic binder, an organic binder, or another suitable bonding material. Suitable binders may include epoxy resins, phosphoric acid binding agents, calcium aluminates, sodium silicates, wood flour, or clays. In one embodiment, the coating may be deposited on the inner surface 28 or to the outer surface of the filler material 12 as a liquid dispersed mixture of alumina-silicate-based, organically bonded refractory mix. In other embodiments, the coating may include at least one of alumina or silica particles, mixed with a lignosulfonate binder, cristobalite ($SiO_2$), quartz, or calcium lignosulfonate. The calcium lignosulfonate may serve as a binder. In one embodiment, the coating may include any types of coatings used in coating casting ladles or vessels such as IronKote or Ladlekote type coatings. In one embodiment, a liquid coating may be deposited on a portion of the inner surface 28 or on the outer surface of the filler material 12, and may include high temperature Ladle Kote 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers.

The exact thickness of the coating may vary and may be dictated by, among other things, the materials used for the particular component or the filler material 12 or both, and the desired degree of vibration damping. Examples of thicknesses may range from about 1 µm-400 µm, 10 µm-400 µm, 30 µm-300 µm, 30 µm-40 µm, 40 µm-100 µm, 100 µm-120 µm, 120 µm-200 µm, 200 µm-300 µm, 200 µm-550 µm, or variations of these ranges.

The filler material 12 may provide an opposing matter that moves against or otherwise contacts the inner surface 28 of the chamber 10 when the particular component is vibrated. The filler material 12 may fill the chamber 10 completely or may only partially fill the chamber. The filler material 12 may be composed of a matter that absorbs energy such as a metal, a metal alloy, a polymer, a ceramic, a plastic, a powdered material; or may be a solid which can convert into a liquid with the application of heat such as gallium, a paraffin wax, or the like; or may be a liquid which can convert into a solid with the application of a magnetic field such as a magnetorheological (MR) fluid, or with the application of an electric field such as an electrorheological (ER) fluid.

In at least one embodiment, the component may include a first material, and the filler material 12 may include a second material that has a lower melting temperature than the first material. This temperature relationship is possible because of how the component is made with the chamber 10 and filled with the filler material 12. That is, the filler material 12 may be filled in the chamber 10 after the component is cast; otherwise, in some cases, the filler material 12 may melt when being poured-over and contacted by the molten material of the component during casting. In some cases, a filler material having a lower melting temperature may exhibit better dampening characteristics as compared to a filler material having a higher melting temperature. For example, the filler material 12 may include a MR fluid, and the brake rotor 14 may include a cast iron having a melting temperature of about 2700° F. (1482° C.), which in some cases is a higher melting temperature than the MR fluid. As a result, the molten cast iron would melt the MR fluid if the molten cast iron contacts the MR fluid during the casting process.

FIG. 1 shows one example method that may be used to form the chamber 10 in the brake rotor 14 and used to fill the chamber 10 with the filler material 12. Skilled artisans will appreciate that the exact method used, including the number of steps, the order of steps, the parameters within each step, and the like, may vary and may be dictated by such factors as the materials used, the desired size and shape of the chamber, and the size and shape of the component. In this example, a cavity or slot 38 may be cut or otherwise machined in the cheek portion 18. The slot 38 may be circumferentially continuous in the cheek portion 18, may be rectangular in cross-sectional profile, and may form a circumferentially continuous open end 40 in the cheek portion 18. The filler material 12 may then be filled or otherwise put in the space defined by the slot 38. The open end 40 may be closed and sealed to thus enclose the slot 38 and form the chamber 10. One exemplary way of closing and sealing the open end 40 is to place a wire such as, but not limited to, a copper wire 42, a solder, or other suitable fusible metal adjacent the open end 40 and to subsequently fuse the copper wire therearound to completely confine the chamber 10 by the cheek portion 18.

FIG. 2 shows another example method that may be used to form the chamber 10 in the brake rotor 14 and used to fill the chamber 10 with the filler material 12. A first portion 44 and a second portion 46 may each be cast as separate components. The first portion 44 may define a first cavity 48 that is circumferentially continuous and somewhat rectangular in cross-sectional profile. The first cavity 48 may have a first open end 50 that is bounded by a first periphery 52. The second portion 46 may define a second cavity 54 that may be complementary in shape and size to the first cavity 48. The second cavity 54 may have a second open end 56 that is bounded by a second periphery 58. The filler material 12 may then be filled in or otherwise put in the space defined by the first cavity 48, the second cavity 54, or both. The first and second portions 44 and 46 may be joined and sealed by bonding, welding, fusing, adhering, or the like at an interface at the first and second peripheries 52 and 58 when the portions are brought together. The first and second cavities 48 and 54 then form the single chamber 10.

Other methods of forming the chamber 10 exist that may not have been shown or described. For example, a sacrificial insert may be used. The sacrificial insert would be shaped and sized according to the desired shape and size of the particular chamber 10, and would be composed of a material that could withstand (i.e. not melt at) the temperature of the molten material of the particular component during casting. The sacrificial insert would be positioned in a die of a cast molding machine in order to form the chamber 10 in a desired position in the component. After the molten material is poured, the sacrificial insert may be removed, for example, by etching or machining, and thus leaving the chamber 10.

The above description of embodiments of the invention is merely exemplary in nature and, thus, variations thereof are not to be regarded as a departure from the spirit and scope of the invention.

What is claimed is:

1. A brake rotor comprising:
a component comprising an annular portion, having a circumference, comprising a first material, a second material, and a filler material, the first material being different than the second material, and the filler material being different than the second material, the first material defining at least one cavity in the component, the cavity having an open end around the circumference of the annular portion and the second material traversing the open end and closing the cavity to define at least one closed chamber, the at least one closed chamber defined at least in part by an inner surface, the filler material being completely enclosed within the at least one closed chamber constructed and arranged so that the filler material moves in the at least one closed chamber with vibration of the component, wherein relative movement between the inner surface and the filler material helps to friction damp vibrations in the component when the component is vibrated, the second material comprising a solder, a weld material or a fusible metal wherein the second material is disposed adjacent to the open end and fused around the circumference of the annular portion to confine the cavity.

2. A brake rotor as set forth in claim 1 wherein the filler material completely fills the at least one closed chamber.

3. A brake rotor as set forth in claim 1 wherein the component defines more than one closed chamber, each being confined by the component and each having the filler material enclosed therein.

4. A brake rotor as set forth in claim 1 wherein the at least one closed chamber is formed by cutting the cavity having an open end in the annular portion, and closing the open end by welding at the open end to form the at least one chamber.

5. A brake rotor as set forth in claim 1 wherein the brake rotor comprises a cheek portion and a hub portion extending from the cheek portion, the at least one closed chamber being defined within the cheek portion.

6. A brake rotor as set forth in claim 5 wherein the at least one chamber is formed by cutting a slot having an open end in the cheek portion, and closing the open end in the cheek portion by welding at the open end in the cheek portion to form the at least one closed chamber.

7. A brake rotor as set forth in claim 1 wherein the second material has a lower melting temperature than the first material.

8. A brake rotor as set forth in claim 1 wherein the second material closing the cavity to define at least one closed chamber is a copper wire.

9. A brake rotor as set forth in claim 1 wherein the second material closing the cavity to define at least one closed chamber comprises solder or another fusible metal.

10. A brake rotor as set forth in claim 1 wherein the filler material comprises a metal, a metal alloy, a polymer, a ceramic, a plastic, or a powdered material.

11. A brake rotor comprising:
a hub portion; and
a cheek portion extending from the hub portion;
wherein the cheek portion having a circumference, the cheek portion comprises a first material defining a cavity confined by the cheek portion, the cavity defined at least in part by an inner surface, the cavity having an open end around the circumference of the cheek portion and a second material traversing the open end and closing the cavity to define at least one chamber, the first material being different than the second material and the second material being different than a filler material, the filler material being completely enclosed within the chamber, wherein relative movement between the inner surface and the filler material helps friction damp vibrations in the brake rotor when the brake rotor is vibrated, the second material comprising a solder, a weld material or a fusible metal wherein the second material is disposed adjacent to the open end and fused around the circumference of the cheek portion to confine the cavity.

12. A brake rotor as set forth in claim 11 wherein the filler material completely fills the chamber.

13. A brake rotor as set forth in claim 11 wherein the second material has a lower melting temperature than the first material.

14. A brake rotor as set forth in claim 11 wherein the chamber is formed by cutting a slot having an open end in the cheek portion, and closing the open end in the cheek portion by welding at the open end in the cheek portion to form the chamber.

15. A brake rotor as set forth in claim 11 wherein the second material closing the cavity comprises a copper wire.

16. A brake rotor as set forth in claim 11 wherein the second material closing the cavity comprises solder or a fusible metal.

17. A brake rotor as set forth in claim 11 wherein the filler material comprises a metal, metal alloy, a polymer, a ceramic or a powdered material.

18. A brake rotor comprising:
a first component having an annular portion having a circumference, the annular portion defining at least a first cavity, the first cavity having a first open end around the circumference of the annular potion, a second component defining at least a second cavity, the second cavity having a second open end defined by a second periphery;
a filler material in the first cavity, second cavity, or both; and
at least one chamber defined by the at least first and second cavities, the first and second components being joined and sealed at an interface by a second material comprising a solder, a weld material, or a fusible metal at the first and second peripheries of the first and second open ends to completely enclose the filler material in the first cavity, second cavity or both so that movement of the filler material against at least one of the first or second components friction damps the product wherein the second material is disposed adjacent to the open end and fused around the circumference of the annular potion to confine the cavity.

19. A brake rotor as set forth in claim 18 wherein the first and second components are joined and sealed by a copper wire.

20. A brake rotor as set forth in claim 18 wherein the first and second components are joined and sealed by solder or a fusible metal.

21. A brake rotor as set forth in claim 18 wherein the filler material comprises a metal, metal alloy, a polymer, a ceramic, or a powdered material.

22. A brake rotor comprising:
a component comprising an annular portion having a circumference, the component comprising a first material, a second material, and a filler material, the first material being different than the second material, and the filler material being different than the second material, the first material defining at least one cavity in the component, the cavity having an open end around the circumference of the annular portion and the second material closing the cavity to define at least one closed chamber, the at least one closed chamber defined at least in part by an inner surface, the filler material being completely enclosed within the at least one closed chamber constructed and arranged so that the filler material moves in the at least one closed chamber with vibration of the component, wherein relative movement between the inner surface and the filler material helps to friction damp vibrations in the component when the component is vibrated, the filler comprising a liquid which can be converted to a solid with the application of a magnetic field or an electric field, the second material comprising a solder, a weld material or a fusible metal wherein the second material is disposed adjacent to the open end and fused around the circumference of the annular portion to confine the cavity.

23. A brake rotor comprising:
a component comprising an annular portion having a circumference, the component comprising a first material, a second material, and a filler material, the first material being different than the second material, and the filler material being different than the second material, the first material defining at least one cavity in the component, the cavity having an open end around the circumference of the annular portion and the second material closing the cavity to define at least one closed chamber, the at least one closed chamber defined at least in part by an inner surface, the filler material being completely enclosed within the at least one closed chamber constructed and arranged so that the filler material moves in the at least one closed chamber with vibration of the component, wherein relative movement between the inner surface and the filler material helps to friction damp vibrations in the component when the component is vibrated, the filler comprising a solid which can be converted to a liquid with the application of heat from the component wherein the second material is disposed adjacent to the open end and fused around the circumference of the annular portion to confine the cavity.

24. A brake rotor comprising:
a component comprising an annular portion having a circumference, the component comprising a first material, a second material, and a filler material, the first material being different than the second material, and the filler material being different than the second material, the first material defining at least one cavity in the component, the cavity having an open end around the circumference of the annular portion and the second material closing the cavity to define at least one closed chamber, the at least one closed chamber defined at least in part by an inner surface, the filler material being completely enclosed within the at least one closed chamber constructed and arranged so that the filler material moves in the at least one closed chamber with vibration of the component, wherein relative movement between the inner surface and the filler material helps to friction damp vibrations in the component when the component is vibrated, the filler comprising a powdered material or a ceramic material, the second material comprising a solder, a weld material or a fusible metal wherein the second material is disposed adjacent to the open end and fused around the circumference of the annular portion to confine the cavity.

25. A brake rotor comprising:
a component comprising an annular portion, the component comprising a first material, a second material, and a filler material, the first material being different than the second material, and the filler material being different than the second material, the first material defining at least one cavity in the component, the cavity having an open end around the circumference of the annular portion and the second material closing the cavity to define at least one closed chamber, the second material closing the cavity, the second material comprising a fusible metal, the at least one closed chamber defined at least in part by an inner surface, the filler material being completely enclosed within the at least one closed chamber constructed and arranged so that the filler material moves in the at least one closed chamber with vibration of the component, wherein relative movement between the inner surface and the filler material helps to friction damp vibrations in the component when the component is vibrated wherein the second material is disposed adjacent to the open end and fused around the circumference of the annular portion to confine the cavity.

26. A brake rotor as set forth in claim 25 wherein the fusible metal comprises copper.

27. A brake rotor as set forth in claim 25 wherein the fusible metal comprises solder.

* * * * *